United States Patent
Beresniewicz

(10) Patent No.: US 11,327,969 B2
(45) Date of Patent: May 10, 2022

(54) TERM VECTOR MODELING OF DATABASE WORKLOADS

(71) Applicant: Oracle International Corporation, Redwood Shores, CA (US)

(72) Inventor: John Mark Beresniewicz, Half Moon Bay, CA (US)

(73) Assignee: Oracle International Corporation, Redwood Shores, CA (US)

(*) Notice: Subject to any disclaimer, the term of this patent is extended or adjusted under 35 U.S.C. 154(b) by 7 days.

(21) Appl. No.: 16/930,157

(22) Filed: Jul. 15, 2020

(65) Prior Publication Data

US 2022/0019585 A1 Jan. 20, 2022

(51) Int. Cl.
*G06F 16/2453* (2019.01)
*G06F 16/22* (2019.01)
*G06F 16/21* (2019.01)
*G06F 16/2458* (2019.01)

(52) U.S. Cl.
CPC ...... *G06F 16/24542* (2019.01); *G06F 16/212* (2019.01); *G06F 16/2237* (2019.01); *G06F 16/2264* (2019.01); *G06F 16/2471* (2019.01)

(58) Field of Classification Search
CPC .......... G06F 16/24542; G06F 16/2264; G06F 16/212; G06F 16/2237; G06F 16/2471
See application file for complete search history.

(56) References Cited

U.S. PATENT DOCUMENTS

| | | | |
|---|---|---|---|
| 10,592,555 B1* | 3/2020 | Zhang | G06F 16/90344 |
| 10,664,527 B1* | 5/2020 | Henderson | G06F 16/3334 |
| 2010/0082602 A1* | 4/2010 | Ganapathi | G06F 16/24545 707/718 |
| 2018/0314735 A1* | 11/2018 | Liu | G06F 16/217 |
| 2019/0294596 A1* | 9/2019 | Yan | G06F 11/301 |
| 2020/0034429 A1* | 1/2020 | Shukla | G06N 3/08 |
| 2020/0201895 A1* | 6/2020 | Sims | G06F 16/285 |

OTHER PUBLICATIONS

E. Garcia, "A Tutorial on Distance and Similarity," available online at < http://www.minerazzi.com/tutorials/distance-similarity-tutorial.pdf >, 2015, 6 pages.

(Continued)

*Primary Examiner* — Dangelino N Gortayo
(74) *Attorney, Agent, or Firm* — Invoke

(57) ABSTRACT

Techniques for managing database workloads using similarity measures based on queries executed are described. Classical techniques from information retrieval are applied to the domain of database workload management. Specifically, the technique of using document term vectors to compute similarity measures are applied using the conceptual mapping of SQL workloads as "documents" composed of SQL queries as "terms." The techniques include generating two or more sets of workloads with each workload representing a set of queries executed on at least one database. Based on the sets of workloads, workload term vectors are calculated that represent the set of queries executed on the database. Then, based on the calculated workload vectors, a similarity score is generated between the two or more sets of workloads.

20 Claims, 6 Drawing Sheets

(56) References Cited

OTHER PUBLICATIONS

E. Garcia, "Cosine Similarity Tutorial," available online at < http://www.minerazzi.com/tutorials/cosine-similarity-tutorial.pdf >, 2015, 11 pages.

E. Garcia, "Term Vector Theory and Keyword Weights," available online at < http://www.minerazzi.com/tutorials/term-vector-1 >, 2016, 7 pages.

E. Garcia, "The Binary and Term Count Models," available online at < http://www.minerazzi.com/tutorials/term-vector-2 >, 2016, 10 pages.

E. Garcia, "The Classic TF-IDF Vector Space Model," available online at < http://www.minerazzi.com/tutorials/term-vector-3 >, 2016, 15 pages.

Maaten et al., "Visualizing Data Using t-SNE," Journal of Machine Learning Research, Nov. 2008, pp. 2579-2605.

Miklov et al., "Efficient Estimation of Word Representations in Vector Space," arXiv:1301.3781v3 [cs.CL] Sep. 7, 2013, 12 pages.

Pennington et al., "GloVe: Global Vectors for Word Representation," Proceedings of the 2014 Conference on Empirical Methods in Natural Language Processing (EMNLP), Oct. 25-29, 2014, pp. 1532-1543.

\* cited by examiner

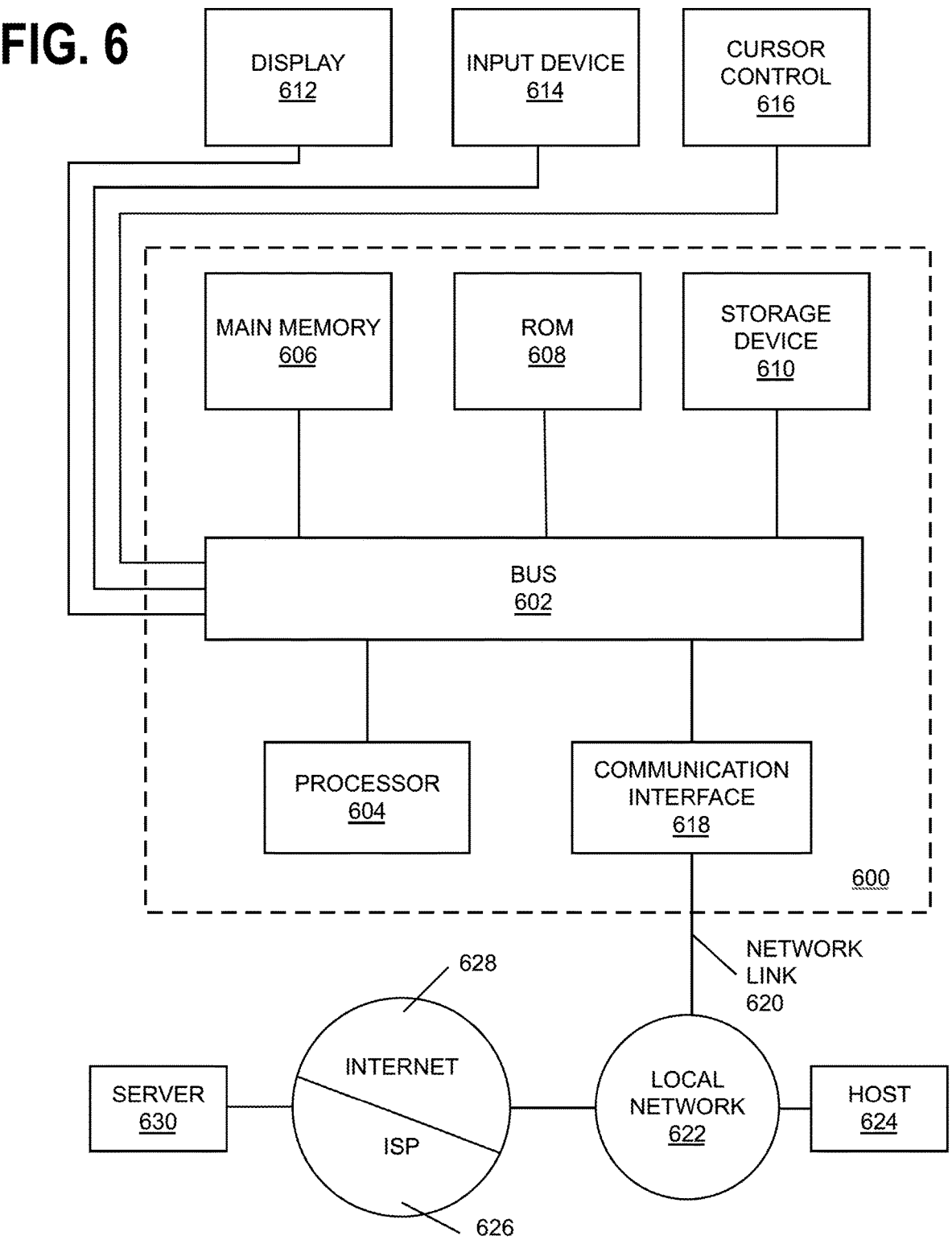

TERM VECTOR MODELING OF DATABASE WORKLOADS

TECHNICAL FIELD

The present disclosure relates to analyzing database workloads. In particular, the present disclosure relates to analyzing database workloads using classical information retrieval models.

BACKGROUND

The performance of database workloads have typically been modeled and characterized by the amount of infrastructure resources needed to search, retrieve, and store data in the database without accounting for any specific causes that required use of the infrastructure resources. This results in modeling workloads around effects rather than causes, and provides little insight into relationships between potential database workload causes and how that may result in expected resource demand similarities and/or differences.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 shows a block diagram of an example computing system that may implement the features and processes of FIGS. 1-5.

Reference symbols in the various drawings that have the same number indicate like elements.

DETAILED DESCRIPTION

Figure 1A:
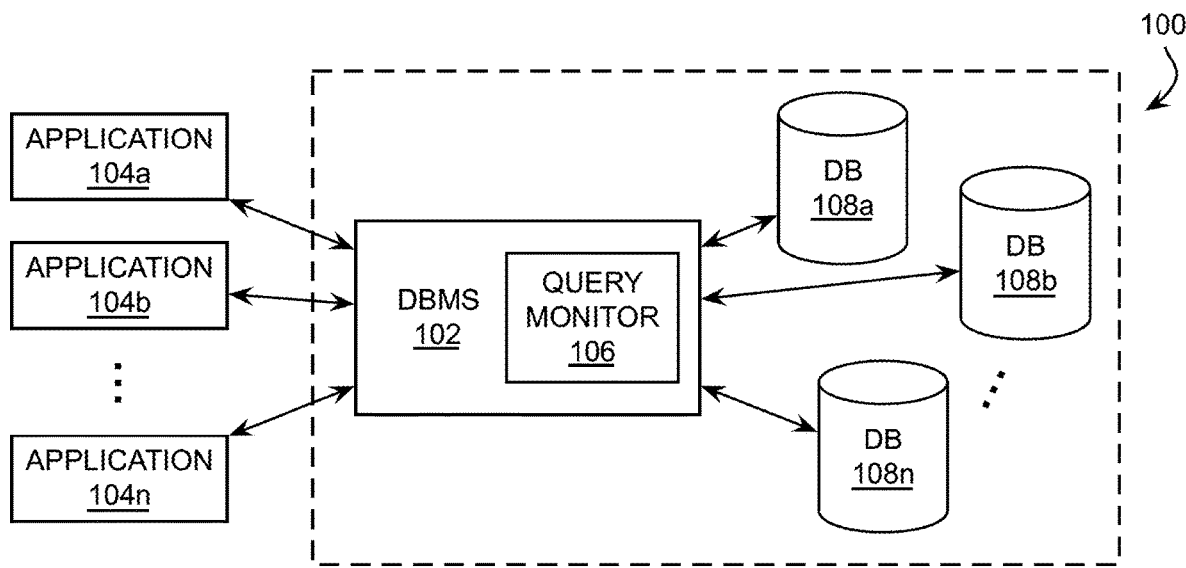
FIG. 1A illustrates an example database system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Details of particular embodiments are provided with respect to the various drawings and the descriptions below. Other enhancements, features, details, and/or advantages of the particular embodiments may be ascertainable by those of skill in the art upon reading the present descriptions and viewing the drawings.

Also, the particular embodiments described herein may be implemented in any computing system environment known in the art, which may include one or more processors and a computer-readable medium configured to store logic, the logic being implemented with and/or executable by the one or more processors to cause the one or more processors to perform operations specified by the logic.

The descriptions presented herein relay sufficient information to enable a person having ordinary skill in the art to make and use the present invention and are provided in the context and requirements of particular embodiments of the present invention.

It is also noted that various modifications to the disclosed embodiments will be readily apparent to a person having ordinary skill in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

Also, unless otherwise specifically defined herein, all terms are to be given their broadest possible interpretation including meanings implied from the specification as well as meanings understood by a person having ordinary skill in the art and/or as defined in dictionaries, treatises, etc.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms. In addition, the term "comprise" indicates an inclusive list of those elements specifically described without exclusion of any other elements. For example, "a list comprises red and green" indicates that the list includes, but is not limited to, red and green. Therefore, the list may also include other colors not specifically described.

1. GENERAL OVERVIEW
2. ARCHITECTURAL OVERVIEW
3. WORKLOAD MANAGER
   3.1 WORKLOAD DEFINITIONS
   3.2 QUERY VECTORS
   3.3 WORKLOAD VECTORS
   3.4 WORKLOAD VECTOR ANALYSIS
4. EXAMPLE EMBODIMENTS
   4.1 DATABASE MANAGEMENT SYSTEM
   4.2 METHOD FOR DATABASE WORKLOAD MANAGEMENT
5. COMPUTER NETWORKS AND CLOUD NETWORKS
6. HARDWARE OVERVIEW
7. MISCELLANEOUS; EXTENSIONS

1. General Overview

One or more embodiments determine the similarity between database requests such as queries. The system represents queries in a term vector space comprised of search identifiers and related identity tokens to allow for database workload characterization. This database workload characterization provides insight into, for example, the performance of the database and its response to changing workloads over time.

One or more embodiments model and match workloads based on similarity and resource usage in order to group or cluster cloud application deployments, monitoring workload transitions for a single database or across multiple databases, monitoring workload balance across multiple nodes, analyzing database usage to determine workload seasonality or variance dependent on time and date, and providing workload problem signatures for comparison against previous issues to improve application support efficiency.

Classical techniques from information retrieval are applied to the domain of database workload management. Specifically, the technique of using document term vectors to compute similarity measures are applied using the conceptual mapping of SQL workloads as "documents" composed of SQL queries as "terms." The techniques include generating two or more sets of workloads with each workload representing a set of queries executed on at least one database. Based on the sets of workloads, workload term vectors are calculated that represent the set of queries executed on the database. Based on the calculated workload vectors, a similarity score is generated between the two or more sets of workloads.

One or more embodiments described in this Specification and/or recited in the claims may not be included in this General Overview section.

2. Architectural Overview

A database is a structured or organized set or collection of structured information ("data") stored to computer readable storage media. A database is usually controlled by a database management system (DBMS) which is configured to monitor, manage, and respond to queries about the data. The data and the DBMS, along with applications and queries that are associated with the data and the DBMS, may be referred to as a database system.

Many databases in use today rely on the relational model (RM) for database management. RM is an approach to managing data using a tabular structure and language consistent with first-order predicate logic. Most relational databases use the Structured Query Language (SQL) data definition and query language to approximate the RM in a consistent and accessible manner. The remainder of the descriptions will be directed toward relational databases using SQL.

SQL may be used to build requests issued to a relational database in order to ensure that the DBMS is able to understand and respond to the request. As used herein, a request which uses SQL may be referred to as an "SQL request" or simply a request or query, when used in conjunction with a relational database or simply database.

The data within a database may be accessible in various ways for use in performing one or more functions. The data may be searched, modified, deleted, created, or in some other way manipulated in response to a request to access the database or specific sets of data therein. Database workloads may be related to any number of different requests to access the data, and similar requests to access data may result in similar infrastructure resource usage to fulfill the similar requests.

FIG. 1A illustrates a database system 100 in accordance with one or more embodiments. As illustrated in FIG. 1A, system 100 includes a DBMS 102 electronically coupled with a plurality of databases 108 (e.g., DB 108a, DB 108b, . . . , DB 108n). One or more applications 104 (e.g., application 104a, application 104b, . . . , application 104n) are electronically coupled with the DBMS 102 in order to access data stored to the databases 108. In one embodiment, one or more of the applications 104 may be included in system 100.

Accessing data may include reading, writing, deleting, and/or modifying a file, register, parameter, or some other data structure stored to any of the databases 108. To access data in the databases 108, an application (e.g., application 104a) issues a query or set of queries corresponding to specific data that may reside in one or more of the databases 108. This query or set of queries is processed by the DBMS 102 to determine whether the data exists in the databases 108, and accesses (e.g., retrieves) the data as described in the query or set of queries for the application responsive to the data being located within the databases 108.

A query monitor 106 is included in the DBMS 102 for monitoring queries issued to the DBMS 102 and/or queries executed by the DBMS 102 on one or more of the databases 108. The query monitor 106 may be implemented within a workload manager in one approach, may be distributed across multiple DBMS, may be a client application executing on one or more computer systems within system 100, etc. In one embodiment, the query monitor 106 is configured to detect a plurality of queries executed on at least one database 108 over a period of time, and store the detected queries to a memory for further processing and/or analysis.

In one or more embodiments, the system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, a database 108 is any type of storage unit and/or device (e.g., a file system, data repository, collection of tables, or any other storage mechanism) for storing data. Further, a database 108 may include multiple different storage units and/or devices. The multiple different storage units and/or devices may or may not be of the same type or located at the same physical site. Further, a database 108 may be implemented or may execute on the same computing system as the DBMS 102 and/or the query monitor 106. Alternatively or additionally, a database 108 may be implemented or executed on a computing system separate from the DBMS 102 and/or the query monitor 106. A database 108 may be communicatively coupled to the DBMS 102 via a direct connection or via a network.

Information describing queries issued to the DBMS 102 and/or executed by the DBMS 102 on the databases 108 may be implemented across any of components within the system 100.

In an embodiment, system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 1B:
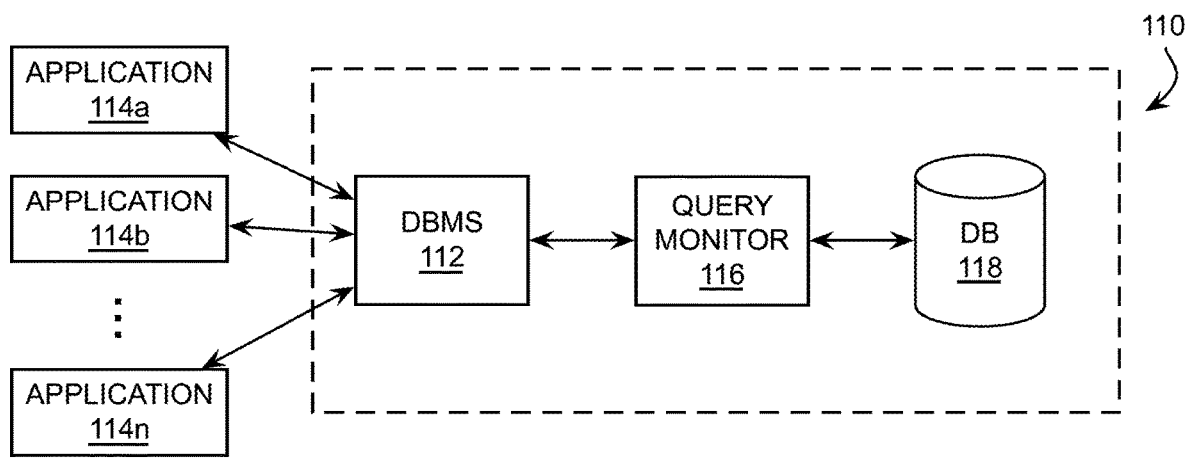
FIG. 1B illustrates another example database system in accordance with one or more embodiments.

FIG. 1B illustrates a database system 110 in accordance with one or more embodiments. As illustrated in FIG. 1B, system 110 includes a DBMS 112 electronically coupled with one database 118. One or more applications 114 (e.g., application 114a, application 114b, . . . , application 114n) are electronically coupled with the DBMS 112 in order to access data stored to the database 118. In one embodiment, one or more of the applications 114 may be included in system 110.

To access data in the database 118, the application 114 issues a query or set of queries corresponding to specific data that may reside in the database 118. This query or set of queries is processed by the DBMS 112 to determine whether the data exists in the database 118, and accesses (e.g., retrieves) the data as described in the query or set of queries for the application 114a responsive to the data being located within the database 118.

A query monitor 116 is included in system 110, but as a separate component from the DBMS 112, for monitoring queries issued to the DBMS 112 (e.g., positioned at an interface to the applications 114, not shown), queries executed by the DBMS 112 on the databases 118 (e.g., positioned at an interface to the database 118 as shown in FIG. 1B), or positioned to monitor both issued and executed queries. The query monitor 116 may be implemented within a workload manager in one approach, may be distributed across multiple DBMS, may be a client application executing on one or more computer systems within system 110, etc. In one embodiment, the query monitor 116 is configured to detect a plurality of queries executed on the database 118 over a period of time, and store the detected queries to a memory for further processing and/or analysis.

In one or more embodiments, the system 110 may include more or fewer components than the components illustrated in FIG. 1B. The components illustrated in FIG. 1B may be local to or remote from each other. The components illustrated in FIG. 1B may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, a database 118 is any type of storage unit and/or device (e.g., a file system, data repository, collection of tables, or any other storage mechanism) for storing data. Further, a database 118 may include multiple different storage units and/or devices. The multiple different storage units and/or devices may or may not be of the same type or located at the same physical site. Further, a database 118 may be implemented or may execute on the same computing system as the DBMS 112 and/or the query monitor 116. Alternatively or additionally, a database 118 may be implemented or executed on a computing system separate from the DBMS 112 and/or the query monitor 116.

A database 118 may be communicatively coupled to the DBMS 112 via a direct connection or via a network.

Information describing queries issued to the DBMS 112 and/or executed by the DBMS 112 on the databases 118 may be implemented across any of components within the system 110.

In an embodiment, system 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware NAT, a hardware load balancer, a mainframe, a television, a content receiver, a set-top box, a printer, a mobile handset, a smartphone, a PDA, a wireless receiver and/or transmitter, a base station, a communication management device, a router, a switch, a controller, an access point, and/or a client device.

3. Workload Manager

Figure 2:
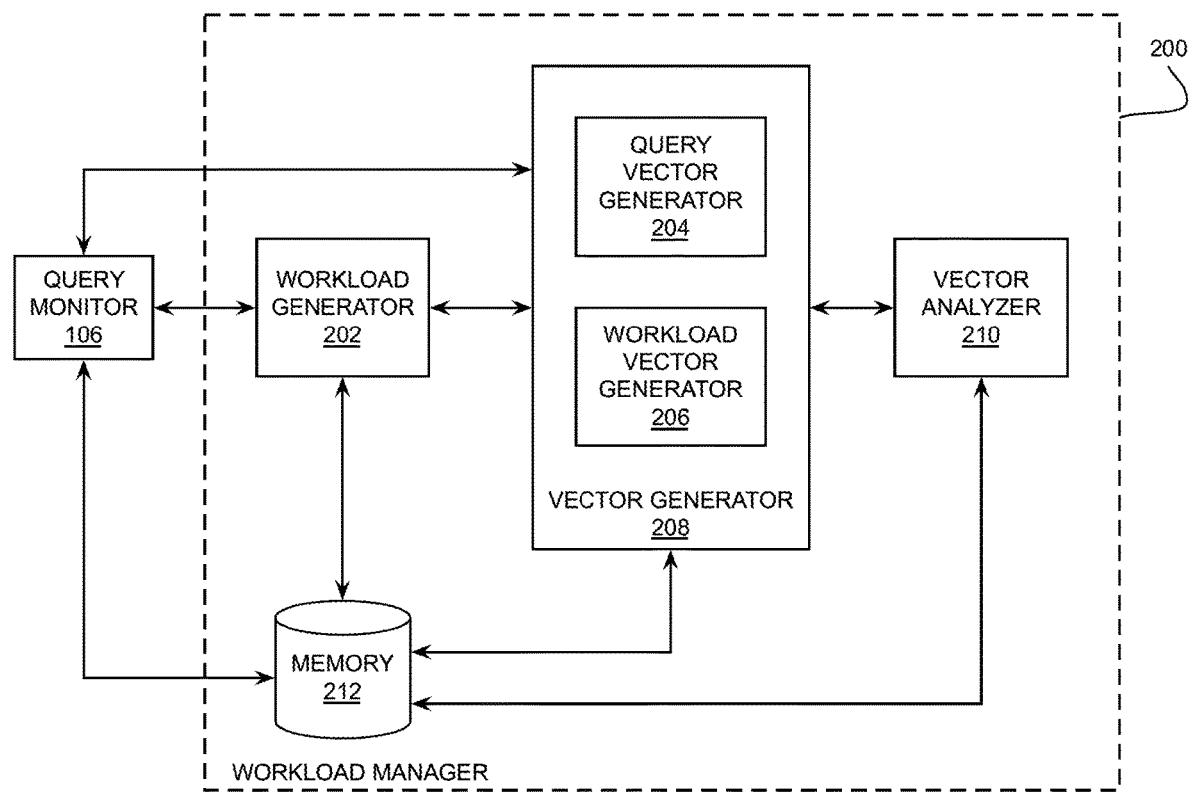
FIG. 2 illustrates an example workload manager in accordance with one or more embodiments.

FIG. 2 illustrates an example workload manager 200 in accordance with one or more embodiments. In one embodiment, the workload manager 200 includes a query monitor 106, a vector generator 208 that comprises a query vector generator 204 and a workload vector generator 206, a vector analyzer 210, and a memory 212 accessible to the workload generator 202, vector generator 208, and vector analyzer 210.

3.1 Workload Definitions

In one embodiment, the query monitor 106 is configured to detect queries sent to a DBMS on one or more databases. In another embodiment, the query monitor 106 is configured to detect queries sent to the DBMS for execution on the one or more databases. In addition, the query monitor 106 may monitor queries across more than one DBMS, and each DBMS may manage more than one database.

In an approach, the query monitor 106 (or some other component of the workload manager 200) may store the monitored and accumulated queries (or some portion thereof) to memory 212, to one of the various databases being monitored, or to some other suitable storage device accessible to the workload manager 200.

The stored queries and information pertaining to the queries (timestamp, database(s) related to the query, location of request, location of the database, system(s) used, network(s) used, user(s) involved, etc.) may be stored in a first-in, first-out (FIFO) configuration, such that a rolling window of query information is stored, with the oldest-stored query information being overwritten by newer query information when a finite amount of space for storing the query information is depleted.

In an embodiment, queries executed on one or more databases may utilize SQL to formulate the queries. In this embodiment, each query may be associated with an SQL statement that describes what data the query is directed to in the database(s).

The workload generator 202 is configured to define a set of workloads based on the query information provided by the query monitor 106 and/or retrieved from memory 212. A workload represents one or more queries executed on a database, and typically will include many queries grouped together that adhere to one or more selection criteria. In other words, each set of workloads may be based on selection criteria that set forth conditions that dictate which queries fall into a particular workload.

Any conceivable selection criteria may be used for defining a workload or set of workloads. Some example selection criteria include, but are not limited to, a period of time over which to detect a plurality of queries executed on one or more databases, one or more timeframes within the period of time on which to base generation of sets of workloads, one or more locations associated with queries, one or more users associated with queries, selection of one or more particular databases to monitor (e.g., as a target of a query and/or for query execution), etc.

The period of time may be a cyclic amount of time to repeat monitoring of queries sent to and/or executed by a database (e.g., in a periodic fashion), such as once a year, once a month, once a week, once a day, once an hour, etc. Moreover, a timeframe within the period of time may indicate a snapshot of time to capture all the queries sent to and/or executed by a database in the periodic fashion dictated by the period of time. In a further embodiment, a duration may be provided, which dictates how long to monitor and/or when to stop monitoring a database. The duration may not be used in some implementations, such as when a user manually determines how long to run the monitoring, the monitoring duration is dynamically altered cased on some criteria or condition, or the monitoring continues indefinitely.

For example, assume that a timeframe is 8:00-9:00 AM, a period of time is daily, and a duration is one week. In this example, all queries sent to and/or executed by one or more databases from 8:00-9:00 AM are detected and tracked each day for one week.

Continuing with this example, a set of workloads generated for 8:00-9:00 AM activity on a select database may be compared to sets of workloads generated for other databases using the same selection criteria to determine if certain databases experience greater activity than other databases.

In another example, assume that a timeframe is 5:00 PM Friday-9:00 AM Monday (e.g., the weekend), a period of time is weekly, no duration is given, and requests from New York City (NYC) locations are specified. In this example, all queries from NYC sent to and/or executed by one or more databases each weekend are detected and tracked indefinitely.

Continuing with this example, a set of workloads generated for each weekend may be compared to other weekend workloads to determine if any unusual activity has been executed on one or more databases that originated from NYC. This same selection criteria may be used for all other locations to draw conclusions on whether weekend activity is greater or less at some locations compared to others.

A location(s) associated with a query may include, but is not limited to, a location of a system which originated the query, a location of one or more applications that access the database(s), a location where the query is to be executed (e.g., location of the database), one or more locations included in search criteria of the query, etc.

A user(s) associated with the query may include, but is not limited to, a user who originated the query or operated an application which accessed the database(s), one or more users included in search criteria of the query, etc.

A selection of one or more particular databases to monitor for query execution is used when it is known which databases to search for information or data, and the query will only be performed on the specified database(s) in exclusion of searching any databases not specified in the selection criteria.

In one implementation, the workload generator 202 may generate sets of one or more workloads representing respective sets of queries executed on one or more specified (or all) databases on which queries are being monitored by the query monitor 106. Should selection criteria be provided, the selection criteria is used for generating the sets of workloads based on queries selected from all monitored queries for all databases that adhere to the selection criteria.

In an approach, the workload generator 202 (or some other component of the workload manager 200) may store the sets of one or more workloads to memory 212, one of the various databases being monitored, or to some other suitable storage device accessible to the workload manager 200.

3.2 Query Vectors

The vector generator 208 includes two components: a query vector generator 204 for generating query vectors, and a workload vector generator 206 for generating workload vectors. Each of these individual components may be separate or combined in a single vector generator, and are shown in FIG. 2 as a single component that perform related, but separate functions.

The query vector generator 204 is configured to input one or more sets of queries. The sets of queries may correspond to one or more sets of workloads in an approach, but the workload definition is not required for the query vector generator 204 to perform its functions.

The query vector generator 204 generates a plurality of query vectors corresponding respectively to a number of different queries included in the sets of queries, one query vector for each individual query. Each query vector is a representation of a corresponding query in a multidimensional vector space.

The multidimensional vector space includes a number of dimensions at least as great as a number of known query types (or queries) that will be analyzed over any given time period or duration. For example, if there are only four types of queries that are ever executed on or sent to a database, then the vector space would include at least four dimensions, and each query would have a value (from zero to a predefined maximum value, e.g., one, ten, 100, etc.) in one dimension of the vector space.

In one approach, a maximum query vector value in any single dimension is equal to one, and the query vector has a value of zero in every dimension except the dimension which represents the query on which the query vector is based. In other words, a resultant query vector has a value only in a dimension corresponding to its query type and zero in all other dimensions.

For context, the vectors that are represented in the vector space may be referred to as "term vectors," as the technique of modeling a document as a vector in a multidimensional vector space is leveraged, in one or more embodiments, by considering each distinct query as a term in a separate dimension and a workload as a document comprising a plurality of terms. Each document is represented by a workload vector (comprised of the various term vectors) within the vector space. The weight to assign the presence of a term in a document may be determined according to any number of schemes, including a binary scheme where the value assigned for a vector dimension is 0 (denoting no presence of this term) or 1 (denoting at least one instance of the term).

Term vectors are used in techniques of modeling a document as a vector in a multidimensional vector space. Each document is modeled to be composed of a collection of (unordered) terms. Even though terms are actually in a specific order within any particular document, this ordering is not considered in the model. The vector space is constructed by considering each distinct term in an entire corpus of documents as a separate dimension. The value of the document j vector in dimension/term i is determined, in some approaches, by a weighting function whose value is 0 when the term is not contained in the document, and some nonzero value otherwise (1 when binary weighting is used). That is, each document is represented by a separate vector from this large vector space.

Various techniques may be used to assign the nonzero vector weights for term i in document j, including but not limited to, Binary weighting (e.g., one-hot), Term Frequency weighting, term frequency inverse document frequency (TF-IDF) weighting, etc.

In this way, every workload is represented by a vector of values that are nonzero for every query (dimension) represented by the workload, the specific values (weights) being assigned using different statistics over existence and frequency of occurrence in that workload and in consideration of the larger corpus of workloads being analyzed.

In binary encoding, the vector value (weight) for a document (e.g., workload)j in any term (e.g., query) dimension i is: 1, responsive to term i appearing in document j, and 0 responsive to term i being absent from document j.

The binary weighting model does not distinguish between single or multiple occurrences of a given term (e.g., query). In search use cases, documents in which a term appears more than once may be more relevant than those with only a single occurrence (which may be in passing). This gives rise to the frequency model, where the vector value for document (e.g., workload) j in dimension i is: $f_{ij}$ responsive to term (e.g., query) i appearing in document j, and 0 responsive to term i being absent from document j, where $f_{ij}$ is the frequency of occurrence of term i in document j.

The TF-IDF weighting model combines term frequency with a measure of a term's discriminatory power across the corpus of documents. In this model, terms (e.g., queries) that occur frequently across documents (e.g., workloads) or even in every document are assigned negligible (or zero) weight, as their presence does not meaningfully distinguish between documents. This additional factor in the weighting is called the Inverse Document Frequency (IDF) and is computed as: $IDF_i = \log(D/d_i)$, where D is the total number of documents, and $d_i$ is the number of documents containing term i. Therefore, the complete TF-IDF model weights the dimension for term i in document j as the product of in-document frequency and corpus IDF: $w_{ij} = f_{ij} * IDF_i$. Note that the weight will be zero if the term appears in every document, since $\log(D/D) = \log(1) = 0$.

One or more other TF-IDF variants may be used in addition to or in place of any of the above described weighting models. These variants may alter or modify the local (frequency) and global (IDF) components of the weighting scheme in some way.

In an embodiment, when each query is represented by an SQL identifier (e.g., SQL_ID, or some other query identifier unique to the particular query), each unique query identifier is represented in the multidimensional vector space by a (vector having) a distinct dimension. In other words, SQL identifiers are mapped to vector dimensions in the multidimensional vector space to allow the SQL identifiers to approximate terms used in a document, and this allows for SQL workloads (e.g., a collection of SQL identifiers that adhere to a set of selection criteria) to approximate the document (e.g., a collection of these terms).

In one approach, a force matching signature technique may be employed to determine term vector dimensions in the multidimensional vector space, in place of SQL identifiers. This approach is particularly useful when a large portion of the queries which form the workloads rely on literals in their SQL formulation to overcome small, insignificant differences in SQL formulations which accomplish the same result. The force matching signature technique may be considered to be analogous to mapping "synonyms" in a document to a common dimension in the term vector space. Similarly, SQL identifiers that differ only in literals may be considered "synonymous," and the force matching signature is used as the common dimension to which these synonymous SQL identifiers are mapped to even though they are not exact matches to one another.

In another approach, SQL plan hash values may be used as term vector dimensions in the multidimensional vector space in place of SQL identifiers. This approach is particularly useful when workloads include many variations of queries with the same underlying query execution plan.

In one embodiment, the query vector generator 204 generates a plurality of query vectors corresponding respectively to each of a set of queries (which may represent a workload) by determining a plurality of query identifiers corresponding respectively to each query of the set of queries. Then, the query vector generator 204 determines a unique set of query identifiers from the plurality of query identifiers (e.g., a list of query identifiers that does not include any duplicate entries), and assigns or creates a multidimensional vector space that includes at least as many dimensions as there are unique query identifiers. Each dimension corresponds to one of the unique set of query identifiers. The query vector generator 204 also assigns values in each unique dimension in the multidimensional vector space in order to generate a plurality of query vectors.

With the workload-document mapping, one or more term weighting models or schemes may be used to weight and compare members of a collection of workloads (a document corpus) for similarity (using a similarity score). For example, clustering techniques may be applied over the collection of workloads using the similarity score to investigate workload groupings, patterns that the workloads adhere to, seasonality of workloads, etc.

In an approach, the values assigned in each unique dimension may be weighted based on one or more factors to adjust the value assigned to the corresponding query vector greater or less. In one approach, one factor used for weighting may be a number of times (e.g., a frequency) that a corresponding query is executed and/or present within the first set of workloads. In a further approach, TF-IDF principles may be used to determine weighting for each value assigned to the various query vectors in the multidimensional vector space.

In another approach, a weighting factor weighting may be a recency or timestamp indicating when a query is issued and/or executed. In a further approach, more recent queries may be weighted greater than less recent queries to provide more weight to more recent activity. In an alternate approach, less recent queries may be weighted greater than more recent queries to provide more weight to past activity.

In more approaches, weighting factors may include identity of a user who issued the query, a database on which the query is issued/executed, a size of the query, a size of the database on which the query is issued/executed, etc.

3.3 Workload Vectors

Referring again to FIG. 2, the workload vector generator 206 is configured to input a plurality of query vectors, with the plurality of query vectors representing a set of workloads. The workload vector generator 206 calculates, based on the plurality of query vectors, a workload vector corresponding to the set of workloads.

In one embodiment, the workload vector generator 206 calculates the workload vector by combining the plurality of query vectors in the multidimensional vector space. In this embodiment, each individual query vector will provide a value in a single dimension, and the workload vector will include each of these dimension values in a single composite vector representative of the workload on which the plurality of queries are representative.

Any method of combining the plurality of query vectors into a single workload vector may be used, as long as a workload vector cumulatively represents each of the plurality of queries (and therefore the query vectors) that form the workload vector.

3.4 Workload Vector Analysis

The vector analyzer 210 inputs workload vectors, and computes one or more similarity scores between one or more different workload vectors. In one approach, the similarity score may be based on the cosine similarity between a first workload vector and a second workload vector.

When implemented in a system which utilizes SQL queries, the computations of cosine similarity between workloads may be accomplished using a straightforward schema and relatively simple analytic SQL. This is advantageous, as SQL workload collection, storage, and analytics may be fully hosted and co-located at an installation site, which allows for faster, latency-reduced, sensitive use cases, like monitoring.

The vector analyzer 210 may utilize cosine similarity for comparing workload vectors. In this implementation, the vector analyzer 210 is configured to compute the cosine of the angle between any two workload vectors A,B in a multidimensional vector space using standard algebraic constructs of vector dot products and lengths. For example, $cosine(\Theta)=A \cdot B/(\|A\| \times \|B\|)$, where $A \cdot B$ is the vector dot product of A and B, and $\|A\|$ and $\|B\|$ are the vector lengths (values) of A and B. Note that when the cosine value is 1, the angle $\Theta$ is 0 and thus the workload vectors are oriented in the same direction within the multidimensional space. In this case, these workload vectors A,B are considered to be identical from the similarity point of view, even if the lengths of the two workload vectors differ.

In one embodiment, the vector analyzer 210 may determine that two sets of workloads are substantially equivalent or equal based on analysis of the similarity score with respect to a similarity threshold value. The similarity threshold value may be manually set, automatically selected (e.g., based on historically similar workloads), adjusted according to a learning algorithm, etc. For example, when a cosine similarity (having a range of values from 0 to 1, denoted by x) is used, the similarity threshold may be set at greater than 0.5 ($x>0.5$), greater than 0.75 ($x>0.75$), greater than 0.9 ($x>0.9$), etc. It is noted that fixed similarity thresholds may not be implemented in a meaningful way, as the cosine similarities are all relative within the context of the plurality of workloads (workload corpus) used to define the particular multidimensional vector space. That is, there is no specific general meaning for any particular similarity score, e.g., a similarity score of 0.7, but within a given workload corpus context if similarity(A,B)=0.7 and similarity(B,C)=0.3, then a determination that workload A is more similar to workload B than workload C is observable.

The use of a "learning algorithm" within the context of a continuously evolving workload (e.g., a single database over time) may be used to formulate a relative concept of similarity/dissimilarity (each period of time relative to one or more preceding periods of time). Monitoring and detecting fluctuations in the similarity score is useful for making such determinations in one approach.

In an approach, the vector analyzer 210 (or some other computing device or manual user input) may generate a plurality of similarity score ranges. The various similarity score ranges may establish several different similarity score ranges that indicate differing degrees of similarity. For example, a low scoring range may indicate no similarity or dissimilar workloads, a middle score range may indicate possible similarity (which may trigger additional investigation, manual intervention, etc.), and a high scoring range may indicate the sets of workloads are substantially equivalent. For example, when a cosine similarity (having a range of values from 0 to 1, denoted by x) is used, the low scoring range may be set at $0 \leq x \leq 0.45$, the middle score range may be set at $0.45 \leq x \leq 0.8$, and the high scoring range may be set at $0.8 \leq x \leq 1$. Of course, these ranges are for example only, and any specific thresholds and any number of ranges may be used to denote differing degrees of similarity.

In another example, a low scoring range may indicate no similarity or dissimilar workloads and a high scoring range may indicate the sets of workloads are substantially equivalent. For example, when the similarity score (denoted by y) has a range of values from $-10$ to 10, the low scoring range may be set at $-10 \leq y \leq 0$, and the high scoring range may be set at $0 < y \leq 10$. Of course, these ranges are for example only, and any specific thresholds and any number of ranges may be used to denote differing degrees of similarity.

Based on the similarity score between workload vectors (and the underlying workloads), the DBMS (or some other computing device) may perform an action. Some example actions include, but are not limited to, clustering together different sets of workloads that share similar characteristics, reserving and/or appropriating resources for operating at least one database sufficient for processing a set of workloads at an expected time of experiencing another set of workloads similar to the analyzed set of workloads, identifying a pattern of similar sets of workloads across more than one database, alerting an administrator to significant and unexpected changes in a workload, etc.

When there are many separate deployments of essentially the same application suite, but with different modules and configurations deployed, it may be difficult to monitor which workloads generated are similar across the various deployments. However, a query identifier (such as SQL identifier) issued by the application will repeat across the deployments whenever the same functionality (and thus query on a database) is invoked. With this framework, a universe of all possible SQL identifiers issue-able from the application(s) across deployments and configurations is used to construct the multidimensional vector space universe of possible workload query vectors. Here each individual deployment's SQL workload vector represents an instantiated concrete subset drawn from this vector space.

With this model, it is possible to determine which deployment workloads are most similar to each other, and whether there are any clusters of highly similar workloads among the many deployed workloads. This information can help database administrators group databases with similar workloads together for common management and configuration, or separate databases with highly dissimilar workloads for independent management and configuration, as several examples of implementations possible using this model.

In one embodiment, abrupt or unexpected changes in workload composition may be detected by looking at fluctuations in similarity between successive workloads. Also, the "volatility" of a workload may be indicated by consistently low (volatile) or high (stable) values of cosine similarity between successive workloads. This information may be used to detect unexpected shifts in workload that could indicate suspect, unauthorized, and/or malicious use of database resources.

In another embodiment, because many databases host applications that induce workloads that both change over time and repeat over time, it is expected that repeated workloads will have similar SQL signatures. This is often referred to as seasonality of workload, and is typically measured through temporal fluctuations in coarse system-level measures, like "Transactions-per-Second" or "Block-Changes-per-Transaction," but not by comparing workloads at the SQL identifier level. Seasonal workload similarity can be used to identify when expected shifts in workload should occur, as well as assist in capacity planning exercises.

System-scale performance or operational issues may be characterized in part by which SQL identifier workload(s) is executing at the time of the issue. Some SQL statements may be relevant to the issue and some may not. By developing a corpus of known problem workload signatures, new issues arising in database operation may be given a SQL workload signature based on the SQL executing at time of the problem that is then compared for similarity with other such problem signatures from previous issues to help detect matching problematic workloads and allow for known corrections to be made to remediate the current issue.

In one or more embodiments, the workload manager 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

4. Example Embodiments

Detailed examples are described below for purposes of clarity. Components and/or operations described below should be understood as one specific example which may not be applicable to certain embodiments. Accordingly, components and/or operations described below should not be construed as limiting the scope of any of the claims.

4.1 Database Management System

Figure 3:
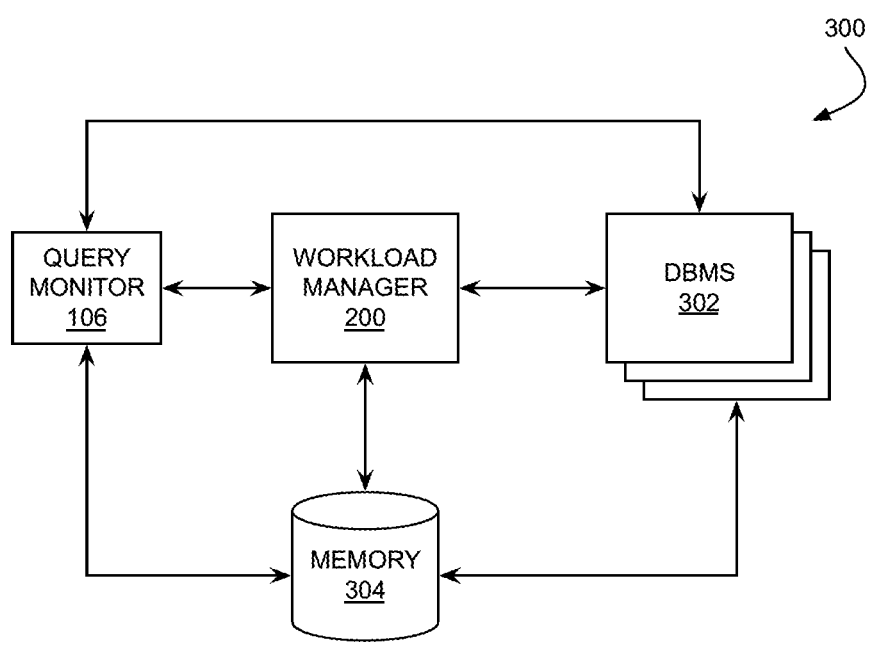
FIG. 3 illustrates an example workload management system in accordance with one or more embodiments.

FIG. 3 illustrates an example workload management system 300, in accordance with one or more embodiments. The example workload management system 300 is provided to give context to how the various components described in FIGS. 1A, 1B, and 2 may be included in a single system for managing workloads for one or more databases in one or more embodiments. The workload management system 300 includes a query monitor 106, a workload manager 200, at least one DBMS 302 coupled to one or more databases, and a memory 304 for storage of data and information associated with the calculation, use, modification, and analysis of queries, query vectors, workload vectors, and similarity scores between workload vectors.

In one or more embodiments, the workload management system 300 may include more or fewer components than the components illustrated in FIG. 3. The components illustrated in FIG. 3 may be local to or remote from each other. The components illustrated in FIG. 3 may be implemented in software and/or hardware. Each component may be distributed over multiple applications and/or machines. Multiple components may be combined into one application and/or machine. Operations described with respect to one component may instead be performed by another component.

4.2 Method for Database Workload Management

Figure 4:
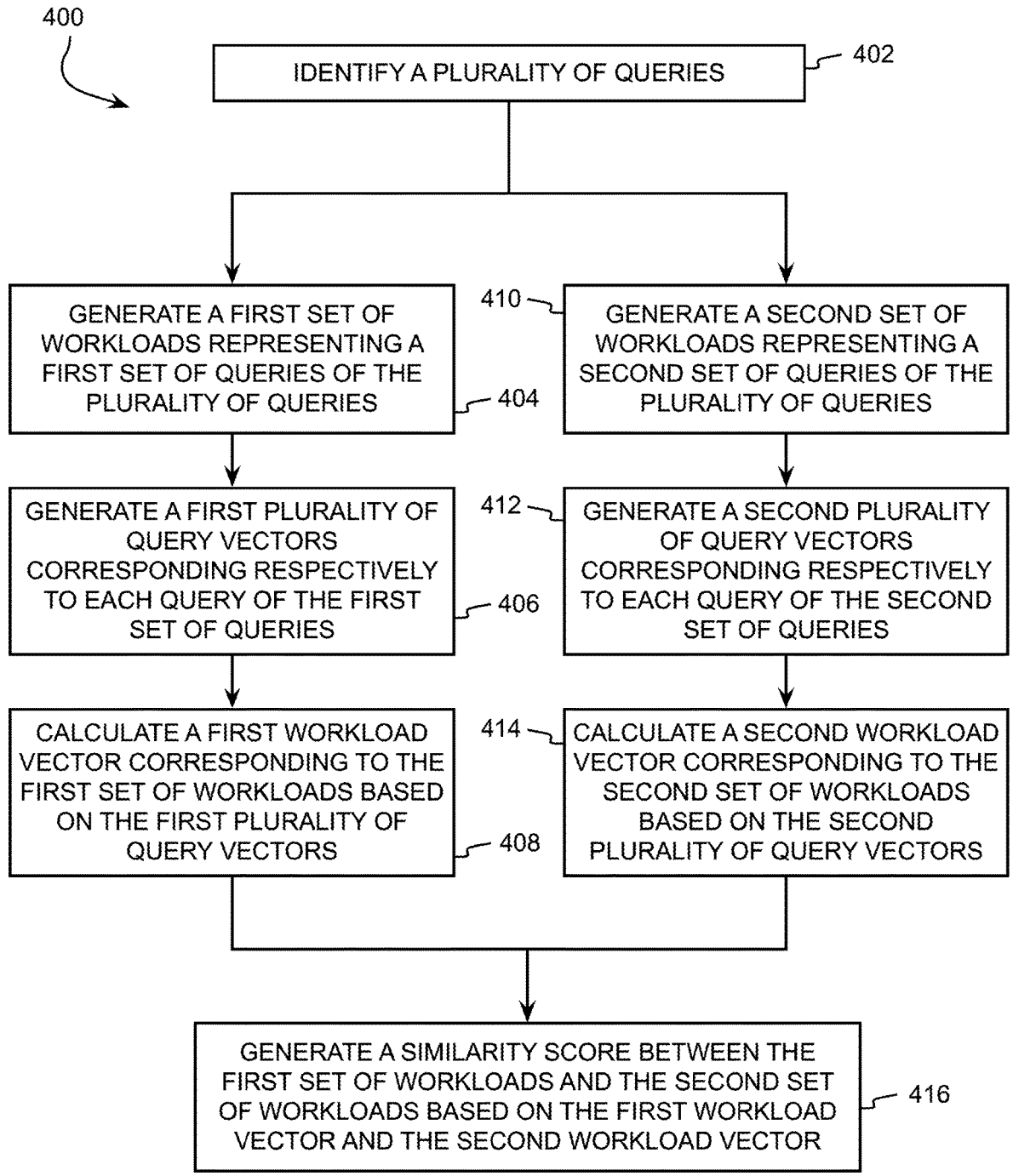
FIG. 4 illustrates an example method for managing database workloads, in accordance with one or more embodiments.

FIG. 4 illustrates an example method 400 for managing database workloads in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In operation 402, a computing device identifies a plurality of queries. The queries may be executed on at least one database, received by a database, issued to a database, etc. The computing device may be a DBMS, workload manager, query monitor, or some other suitable device.

To identify the queries, a query monitor may be used to intercept database requests sent to one or more databases and accumulate the database requests as queries. The queries may be filtered to include a subset of all queries identified by the query monitor, such as only queries executed on at least one database, all queries sent to a particular database, queries received by a particular group of databases, etc.

In another approach, a database system may monitor queries, and such monitored queries may be shared with other database systems to identify queries issued across all databases in each database system.

In one approach, the computing device receives selection criteria. The selection criteria may be used in a later operation to generate a first set of workloads and a second set of workloads. A workload is a plurality of queries that are grouped together. The selection criteria is useful for establishing these groups of queries from among a larger population. In an example of this grouping, assume that selection criteria for workloads dictates that each workload is selected from the set of all queries issued last week as requests to a particular database, and each workload groups queries from the same hour of the different days into groups, resulting in 24 workloads, each workload containing seven hours worth of queries. Any type of selection criteria may be provided and used in establishing the queries which fall into the definition of a workload, e.g., selection of one or more of a day, time, time period, periodicity, deployment, system, location, user, database, etc.

In operation 404, the computing device generates a first set of one or more workloads representing a first set of queries of the plurality of queries. The first set of queries represent all queries issued to and/or executed by one or more databases within the defined selection criteria in one embodiment. Each workload of the first set of workloads represents sets of queries executed within particular boundaries. The boundaries may be time-based, location-based, user-based, database-centric, etc.

In operation 406, the computing device generates a first plurality of query vectors corresponding respectively to each of the first set of queries. Each query vector, in an approach, may be based on an SQL identifier for a query executed on the particular databases being monitored. A query monitor and/or DBMS is configured to assign a uniquely determined token to each query based on text of the query such that re-occurrence of that query on the same or other databases will result in computation of the same token. These tokens or SQL identifiers are the dimensions in the multidimensional vector space within which the query vectors and workload vectors exist.

In operation 408, the computing device calculates, based on the first plurality of query vectors, a first workload vector corresponding to the first set of workloads. Each workload vector, in an approach, may be based on a collection of SQL identifiers for all queries executed on the particular databases being monitored.

In an approach, the first workload vector may be calculated by combining the first plurality of query vectors using vector combination techniques which account for all dimension values of the collection of query vectors.

In operation 410, the computing device generates a second set of one or more workloads representing a second set of queries of the plurality of queries. The second set of queries represent all queries issued to and/or executed by one or more databases within the same or different defined selection criteria. Each workload of the second set of workloads represent sets of queries executed within particular boundaries. The boundaries may be time-based, location-based, user-based, database-centric, etc., and may be the same or different from boundaries specified for the first set of one or more workloads.

In an example, the first set of workloads may represent database workloads during working hours (e.g., 9:00 AM-5:00 PM), while the second set of workloads may represent database workloads during non-working hours (e.g., 5:00 PM-9:00 AM).

In another example, the first set of workloads may represent database workloads for a particular day (e.g., May 26, 2020), while the second set of workloads may represent database workloads for the same day in a different year (e.g., May 26, 2019), for the same day of the week in a different week (e.g., May 19, 2020), for the same day in a different month (e.g., Apr. 26, 2020), etc.

In operation 412, the computing device generates a second plurality of query vectors corresponding respectively to each of the second set of queries. Each query vector, in an approach, may be based on an SQL identifier for a query executed on the particular databases being monitored.

In operation 414, the computing device calculates, based on the second plurality of query vectors, a second workload vector corresponding to the second set of workloads. Each workload vector, in an approach, may be based on a collection of SQL identifiers for all queries executed on the particular databases being monitored.

In operation 416, the computing device generates a similarity score between the first set of workloads and the second set of workloads based on the first workload vector and the second workload vector. For example, the computing device may determine a mathematical comparison between the first workload vector and the second workload vector.

In an approach, the computing device computes the cosine of the angle between the first workload vector and the second workload vector within the multidimensional vector space to determine the similarity score based on cosine similarity.

According to one embodiment, the first set of workloads and the second set of workloads may be considered to be equivalent or substantially equivalent (within a degree of certainty) based on analysis of the similarity score with respect to a similarity threshold value. The similarity threshold value may be set manually, determined automatically, adjusted over time by a learning model, etc.

In a further approach, the computing device may generate more than one similarity score range. At a minimum, this scheme includes a first similarity score range indicating that the first set of workloads and the second set of workloads are substantially equivalent, and a second similarity score range indicating that the first set of workloads and the second set of workloads are dissimilar. Using these similarity score ranges, the computing device compares or places the similarity score in one of the similarity score ranges to determine a degree of similarity between the first set of workloads and the second set of workloads.

In an embodiment, each of the plurality of queries executed on the database may be associated with a SQL statement. In this embodiment, the first set of workloads include SQL identifiers of corresponding SQL statements associated with queries represented by the first set of workloads, and the second set of workloads comprise SQL identifiers of corresponding SQL statements associated with queries represented by the second set of workloads.

Moreover, in an approach, each unique SQL identifier included in the totality of the workloads (e.g., all of the first set of workloads and the second set of workloads) may be represented in a multidimensional vector space by a vector having a distinct dimension.

In one approach, the computing device may generate the first plurality of query vectors corresponding respectively to each of the first set of queries by: a) determining query identifiers corresponding respectively to each of the first set of queries, b) determining all unique query identifiers, c) assigning unique dimensions in the multidimensional vector space corresponding respectively to each of the unique query identifiers, and d) assigning values in each unique dimension in the multidimensional vector space.

In one embodiment, query identifiers may be established in a deterministic fashion such that the same query will get the same query identifier whenever it is issued/executed, and distinct queries will be assigned distinct identifiers. In one approach, a hash value over the query text may be computed and used as a query identifier. In a further approach, the query text may be pre-processed before hashing to assign near-identical queries to the same identifier, referred to as a "force matching signature" in some examples.

In a further approach, the values assigned in each unique dimension may be weighted based on some weighting model. In one such approach, weighting may be based on a number of times a corresponding query was executed within the first set of workloads.

After the similarity score is generated, the computing device may perform an action based on the similarity score. Any particular action may be performed, including but not limited to, adding the first set of workloads and the second set of workloads to a cluster which includes similar workloads, reserving resources for at least one database sufficient for processing the first set of workloads at an expected time of experiencing another set of workloads similar to the first set of workloads, identifying a pattern of similar sets of workloads across more than one database, alerting administrators to significant unexpected changes in workload, etc.

In one or more embodiments, a non-transitory computer readable medium may store instructions, that when executed by a hardware processor, cause execution of one or more operations of any of the above-described methods. According to one or more embodiments, a system may include the non-transitory computer readable medium and the hardware processor.

Variations of the disclosed embodiments are also possible, and the explicit description thereof in this document is not required in order to provide a person having ordinary skill in the art with the ability to conceive of such variations when reading the present descriptions.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

4.3 Example System

Figure 5:
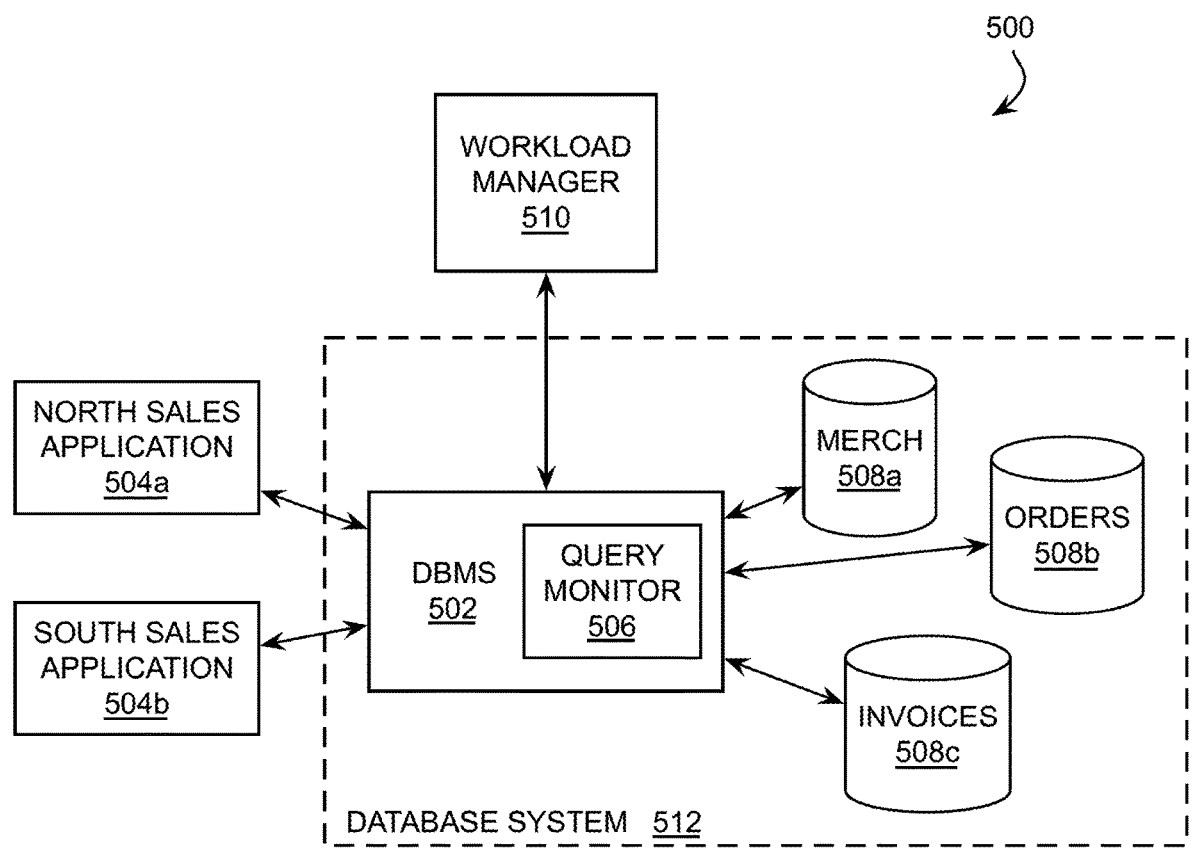
FIG. 5 illustrates an example system in accordance with one or more embodiments.

FIG. 5 illustrates an example system 500 for managing database workloads for a vendor which supplies merchandise to clients. System 500 includes a database system 512, a workload manager 510, and two applications 504 in communication with the database system 512 utilized by sales managers in the field: a North Sales Application 504a and a South Sales Application 504b, dependent upon where the sales manager is geographically located. The database system 512 includes a DBMS 502 that includes a query monitor 506 that monitors database requests for three databases 508: a merchandise database 508a that stores information related to merchandise available for sale, an ordering database 508b that stores information related to orders for merchandise, and an invoicing database 508c that stores information related to invoices for orders that have been processed.

In an example, assume that an administrator wants to determine how workloads differ for the different databases during a typical work week. The administrator may issue selection criteria that identifies which workloads should be compared across each of the databases 508 from Monday to Friday. In other words, workloads targeting the merchandise database 508a, workloads targeting the ordering database 508b, and workloads targeting the invoicing database 508c will be accumulated separately from Monday to Friday.

In order to accomplish this, the query monitor may monitor and store, separately, first queries issued by the north sales application 504a and the south sales application 504b for the merchandise database 508a, second queries issued by the north sales application 504a and the south sales application 504b for the ordering database 508b, and third queries issued by the north sales application 504a and the south sales application 504b for the invoicing database 508c.

The workload manager 510 then creates first query vectors for the first queries, second query vectors for the second queries, and third query vectors for the third queries. Based on these sets of query vectors, the workload manager 510 generates workload vectors for each database that account for the time period monitored (Monday-Friday), e.g., a merchandise workload vector based on the first query vectors, an ordering workload vector based on the second query vectors, and an invoicing workload vector based on the third query vectors.

After the workload vectors have been created for workloads of each database 508, these workload vectors may be compared with one another to determine similarities and/or differences regarding workloads for the various databases 508.

In this example, the workload manager 510 may calculate similarity between the workload vectors for the ordering database 508b and the invoicing database 508c for each day during the Monday-Friday time period, and determine that similar workloads are detected on the invoicing database 508c one day after the ordering database 508b experiences similar workloads. This determination may support a conclusion that invoicing activity is being accomplished with a 24-hour delay compared to ordering activity.

In another example, assume that the administrator wants to determine if similar workloads are executed by the invoicing database 508c in certain patterns on a day-to-day basis for each of the different applications. The administrator may issue selection criteria that identifies that workloads be compared for invoicing database 508c for each four-hour period during a 30-day period separately for the north sales application 504a and the south sales application 504b.

In order to accomplish this, the query monitor may monitor and store queries issued by the north sales application 504a and the south sales application 504b targeting the invoicing database 508c for each four-hour period, separately, for 30 days, resulting in 180 different sets of queries for each application. The workload manager 510 then creates query vectors for each query in the 360 sets of queries. Based on these 360 sets of query vectors, the workload manager 510 generates workload vectors for each four-hour period within each day.

After the workload vectors have been created for each four-hour workload period on the invoicing database 508c for the north sales application 504a and the south sales application 504b, these workload vectors may be compared with one another to determine similarities and/or differences that occur for each application day-to-day, across single days, and across different weeks in the 30-day period.

In this example, the workload manager 510 may calculate cosine similarity between the workload vectors for each 8:00 AM-12:00 PM period for each of the 30 day period for each application and determine, for example, that each workload vector from Monday-Friday have cosine similarity except for the first and fifteenth of the month for each application. This determination may support a conclusion that the first day and fifteenth day in a month have different workload patterns for the invoicing database 508c compared to all other days of the month and additional resources may be allocated to the invoicing database 508c on these days.

Continuing with this example, the workload manager 510 may find little or no cosine similarity between the workload vectors for the north sales application 504a and the south sales application 504b on a certain day in the 30-day period. Moreover, similarities determined between the workloads for the two days leading up to and two days after the dissimilar workload isolated to the south sales application may support a conclusion that a region-wide southern event may have affected invoicing activity for the south region serviced by the south sales application 504b.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a NAT. Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or solid state disk, is provided and coupled to bus 602 for storing information and instructions.

Computer system 600 may be coupled via bus 602 to a display 612, such as a liquid crystal display (LCD), plasma display, electronic ink display, cathode ray tube (CRT) monitor, or any other kind of device for displaying information to a computer user. An input device 614, including alphanumeric and other keys, may be coupled to bus 602 for communicating information and command selections to processor 604. Alternatively or in addition, the computer system 600 may receive user input via a cursor control 616, such as a mouse, a trackball, a trackpad, a touchscreen, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. The display 612 may be configured to receive user input via one or more pressure-sensitive sensors, multi-touch sensors, and/or gesture sensors. Alternatively or in addition, the computer system 600 may receive user input via a microphone, video camera, and/or some other kind of user input device (not shown).

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, solid-state or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 600 can receive the data from the network and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    generating a first set of one or more workloads representing a first set of queries of a plurality of queries executed on at least one database;
    generating a first plurality of query vectors, in a multidimensional vector space, corresponding respectively to each of the first set of queries;
    calculating, based on the first plurality of query vectors, a first workload vector corresponding to a first aggregate of workload across the first set of workloads;
    generating a second set of one or more workloads representing a second set of queries of the plurality of queries;
    generating a second plurality of query vectors, in the multidimensional vector space, corresponding respectively to each of the second set of queries;
    calculating, based on the second plurality of query vectors, a second workload vector corresponding to a second aggregate of workload across the second set of workloads; and
    generating a similarity score between the first set of workloads and the second set of workloads based on the first workload vector and the second workload vector,
    wherein the method is performed by at least one device including a hardware processor.

2. The method as recited in claim 1, further comprising receiving selection criteria for generating the first set of workloads and the second set of workloads.

3. The method as recited in claim 2, wherein the selection criteria is selected from a group consisting of:

a period of time over which to detect the plurality of queries executed on the at least one database;

one or more timeframes within the period of time on which to base generation of the first set of workloads and the second set of workloads;

one or more locations associated with the plurality of queries;

one or more users associated with the plurality of queries; and selection of one or more particular databases from the at least one database.

4. The method as recited in claim 1, wherein each of the plurality of queries executed on the at least one database is associated with a SQL statement, wherein the first set of workloads comprises SQL identifiers of corresponding SQL statements associated with queries represented by the first set of workloads, and wherein the second set of workloads comprises SQL identifiers of corresponding SQL statements associated with queries represented by the second set of workloads.

5. The method as recited in claim 4, wherein each unique SQL identifier included in the first set of workloads and the second set of workloads is represented in a multidimensional vector space by a vector having a distinct dimension.

6. The method as recited in claim 1, wherein generating the first plurality of query vectors corresponding respectively to each of the first set of queries comprises:

determining a first plurality of query identifiers corresponding respectively to each of the first set of queries;

determining a first unique set of query identifiers from the first plurality of query identifiers;

assigning unique dimensions in a multidimensional vector space corresponding respectively to each of the first unique set of query identifiers; and assigning values in each unique dimension in the multidimensional vector space to generate the first plurality of query vectors.

7. The method as recited in claim 6, wherein the values assigned in each unique dimension are weighted based on a number of times a corresponding query was executed within the first set of workloads.

8. The method as recited in claim 1, wherein the first workload vector is calculated by combining the first plurality of query vectors.

9. The method as recited in claim 1, wherein the similarity score is a cosine similarity between the first workload vector and the second workload vector.

10. The method as recited in claim 1, further comprising performing an action based on the similarity score, the action being selected from a group consisting of: adding the first set of workloads and the second set of workloads to a cluster which includes similar workloads, reserving resources for at least one database sufficient for processing the first set of workloads at an expected time of experiencing another set of workloads similar to the first set of workloads, identifying a pattern of similar sets of workloads across more than one database, and alerting an administrator about unexpected workload changes.

11. The method as recited in claim 1, further comprising:

determining that the first set of workloads and the second set of workloads are equivalent workloads based on analysis of the similarity score with respect to a similarity threshold value.

12. The method as recited in claim 1, further comprising: generating a plurality of similarity score ranges comprising, at least:

a first similarity score range indicating that the first set of workloads and the second set of workloads are equivalent workloads; and a second similarity score range indicating that the first set of workloads and the second set of workloads are dissimilar workloads; and comparing the similarity score to the plurality of similarity score ranges to determine a degree of similarity between the first set of workloads and the second set of workloads.

13. A system, comprising:

one or more hardware processors;

a non-transitory computer readable medium comprising instructions which, when executed by the one or more hardware processors, causes performance of operations comprising:

generating a first set of one or more workloads representing a first set of queries of a plurality of queries executed on at least one database;

generating a first plurality of query vectors, in a multidimensional vector space, corresponding respectively to each of the first set of queries;

calculating, based on the first plurality of query vectors, a first workload vector corresponding to a first aggregate of workload across the first set of workloads;

generating a second set of one or more workloads representing a second set of queries of the plurality of queries;

generating a second plurality of query vectors, in the multidimensional vector space, corresponding respectively to each of the second set of queries;

calculating, based on the second plurality of query vectors, a second workload vector corresponding to a second aggregate of workload across the second set of workloads; and generating a similarity score between the first set of workloads and the second set of workloads based on the first workload vector and the second workload vector.

14. The system as recited in claim 13, wherein the operations further comprise receiving selection criteria for generating the first set of workloads and the second set of workloads, the selection criteria being selected from a group consisting of:

a period of time over which to detect the plurality of queries executed on the at least one database;

one or more timeframes within the period of time on which to base generation of the first set of workloads and the second set of workloads;

one or more locations associated with the plurality of queries;

one or more users associated with the plurality of queries; and selection of one or more particular databases from the at least one database.

15. The system as recited in claim 13, wherein each of the plurality of queries executed on the database is associated with a SQL statement, wherein the first set of workloads comprises SQL identifiers of corresponding SQL statements associated with queries represented by the first set of workloads, and wherein the second set of workloads comprises SQL identifiers of corresponding SQL statements associated with queries represented by the second set of workloads.

16. The system as recited in claim 15, wherein each unique SQL identifier included in the first set of workloads and the second set of workloads is represented in a multidimensional vector space by a vector having a distinct dimension.

17. The system as recited in claim 13, wherein generating the first plurality of query vectors corresponding respectively to each of the first set of queries comprises:
   determining a first plurality of query identifiers corresponding respectively to each of the first set of queries;
   determining a first unique set of query identifiers from the first plurality of query identifiers;
   assigning unique dimensions in a multidimensional vector space corresponding respectively to each of the first unique set of query identifiers; and
   assigning values in each unique dimension in the multidimensional vector space to generate the first plurality of query vectors.

18. A non-transitory computer readable medium comprising instructions which, when executed by one or more hardware processors, causes performance of operations comprising:
   generating a first set of one or more workloads representing a first set of queries of a plurality of queries executed on at least one database;
   generating a first plurality of query vectors, in a multidimensional vector space, corresponding respectively to each of the first set of queries;
   calculating, based on the first plurality of query vectors, a first workload vector corresponding to a first aggregate of workload across the first set of workloads;
   generating a second set of one or more workloads representing a second set of queries of the plurality of queries;
   generating a second plurality of query vectors, in the multidimensional vector space, corresponding respectively to each of the second set of queries;
   calculating, based on the second plurality of query vectors, a second workload vector corresponding to a second aggregate of workload across the second set of workloads; and
   generating a similarity score between the first set of workloads and the second set of workloads based on the first workload vector and the second workload vector.

19. The non-transitory computer readable medium as recited in claim 18, wherein the operations further comprise:
   determining that the first set of workloads and the second set of workloads are equivalent workloads based on analysis of the similarity score with respect to a similarity threshold value.

20. The non-transitory computer readable medium as recited in claim 18, wherein generating the first plurality of query vectors corresponding respectively to each of the first set of queries comprises:
   determining a first plurality of query identifiers corresponding respectively to each of the first set of queries;
   determining a first unique set of query identifiers from the first plurality of query identifiers;
   assigning unique dimensions in a multidimensional vector space corresponding respectively to each of the first unique set of query identifiers; and
   assigning values in each unique dimension in the multidimensional vector space to generate the first plurality of query vectors.

\* \* \* \* \*

UNITED STATES PATENT AND TRADEMARK OFFICE
CERTIFICATE OF CORRECTION

PATENT NO. : 11,327,969 B2
APPLICATION NO. : 16/930157
DATED : May 10, 2022
INVENTOR(S) : Beresniewicz Page 1 of 1

It is certified that error appears in the above-identified patent and that said Letters Patent is hereby corrected as shown below:

In the Specification

In Column 12, Line 25, delete "$0.45 \leq x \leq 0.8$," and insert -- $0.45 < x < 0.8$, --, therefor.

Signed and Sealed this
Thirtieth Day of August, 2022

Katherine Kelly Vidal
*Director of the United States Patent and Trademark Office*